Sept. 26, 1944.  C. J. CRANE  2,358,793

NAVIGATION INSTRUCTION DEVICE

Filed June 4, 1943  3 Sheets-Sheet 1

INVENTOR
CARL J. CRANE
BY
ATTORNEYS

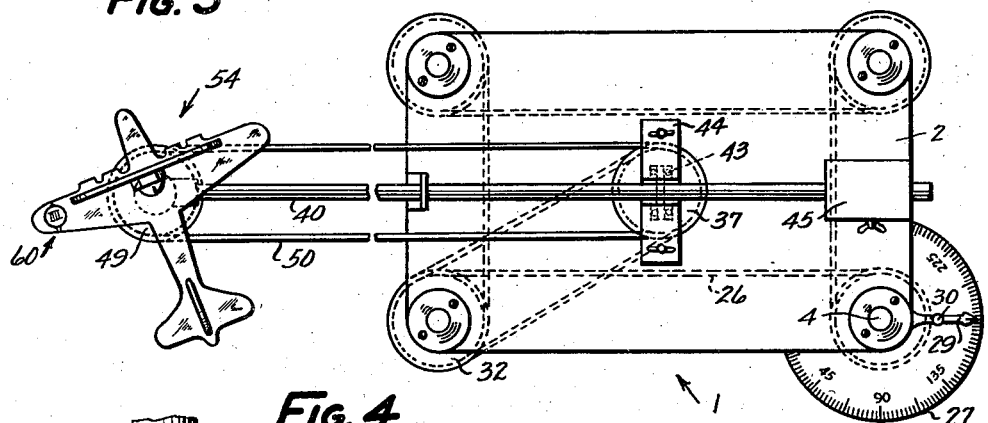
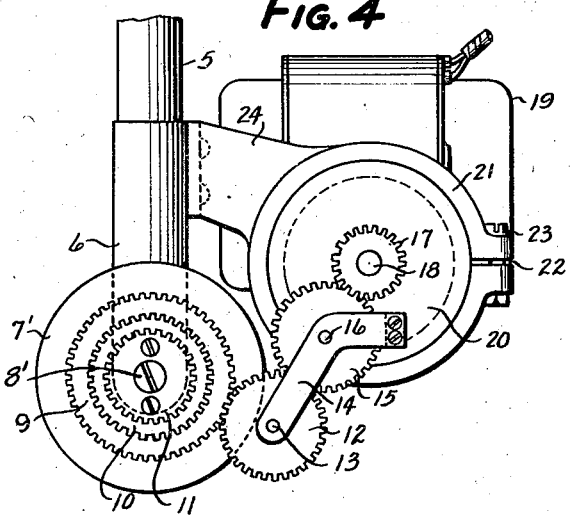
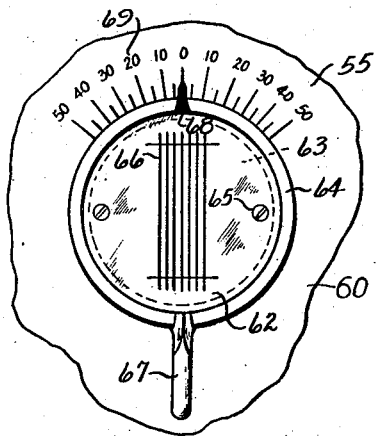
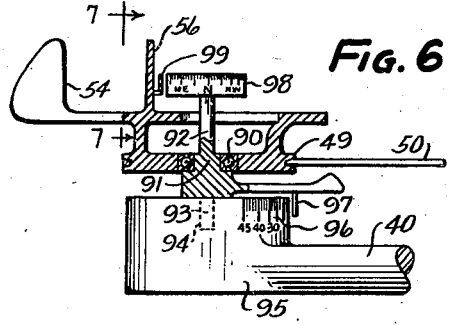
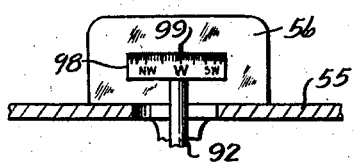

Sept. 26, 1944.  C. J. CRANE  2,358,793
NAVIGATION INSTRUCTION DEVICE
Filed June 4, 1943  3 Sheets-Sheet 3
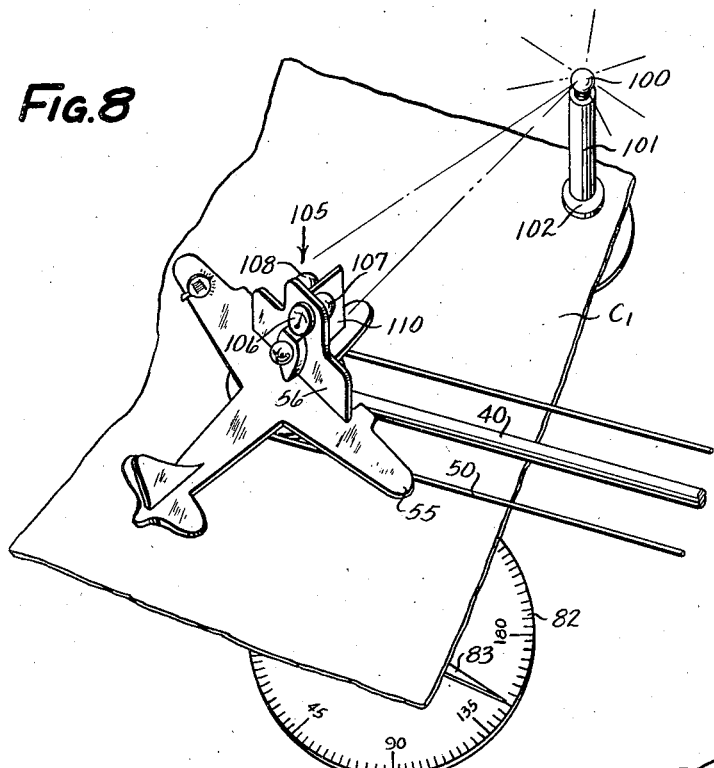
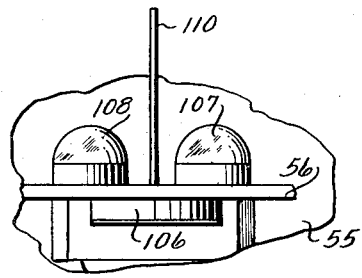
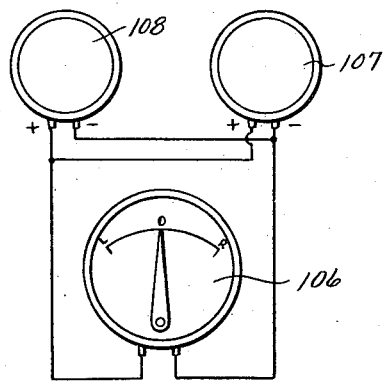
INVENTOR
CARL J. CRANE
BY
ATTORNEYS Patented Sept. 26, 1944

2,358,793

UNITED STATES PATENT OFFICE 2,358,793

NAVIGATION INSTRUCTION DEVICE

Carl J. Crane, Salina, Kans.

Application June 4, 1943, Serial No. 489,610

8 Claims. (Cl. 35—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to navigation instruction apparatus which, due to its simplicity, can be constructed for a very low cost, which makes it available for instruction in civilian pilot training programs, instruction classes in high schools and the like.

The present invention employs basic principles such as disclosed in my copending application Serial No. 415,071, filed October 15, 1941, for Navigation trainer, now U. S. Patent No. 2,326,764, in which a training device comprising a power-propelled, roller-supported carriage physically transported a student over a floor relative to a chart at a speed proportional, in accordance with the scale of the chart, to the assumed airspeed of an aircraft. By observing the chart through a drift sight and controlling the compass heading of the trainer relative to the chart, navigation problems of various kinds can be solved. The cost of such apparatus, though low, would be prohibitive if applied to the purposes of the present invention and, further, requires considerable space for operation.

The present invention comprises two small power-propelled carriages constructed similar to the wind simulator carriage disclosed in my co-pending application Serial No. 334,002, filed May 8, 1940, for improvements on Apparatus for simulating wind effects in aviation ground trainers. One of these carriages serves as a support for a chart and is adapted to move the chart relative to a table top in the direction and scale velocity of an assumed wind and the directional heading and velocity set in by an instructor. The second carriage is adapted to be propelled at a selected scale speed and heading over the table top to correspond to the air course of the flight of an assumed aircraft. The second carriage is provided with a comparatively long counterbalanced arm having a marker at its outer end adapted to leave a record on the chart carried by the first carriage and in addition thereto carries a transparent miniature airplane index. The airplane index is rotatably mounted on the outer end of the arm and connected to the steering mechanism of the second carriage so as to at all times have the same actual heading as the second carriage. The airplane index is preferably provided with a small instrument panel which supports a small magnetic compass which gives directly the magnetic heading of the second carriage. The airplane index also incorporates a drift sight through which by direct observation of the chart, the wind drift can be determined and dead reckoning problems can be readily solved by the student. In addition radio compass navigation problems can be solved by means of a simple photoelectric cell arrangement. By virtue of its compactness the apparatus is readily carried from place to place and can be operated on the surface of a table so that instruction may be given wherever an electrical current supply is available, such as in a school classroom or the like.

The principal object of the present invention is the provision of apparatus for teaching the principles of aerial navigation which is inexpensive and can be operated in a minimum of space, said apparatus including a small steerable power-propelled carriage adapted to move in translation relative to a supporting surface such as a table top in a direction and at a scale velocity representative of the assumed flight of an aircraft, and said carriage having an arm mounted thereon having a miniature airplane index rotatably mounted on its outer end and connected to the steering mechanism of the carriage to have the same azimuth heading as the carriage, and said index incorporating a drift sight and means for propelling a chart relative to the table top in accordance with the direction and at a scale velocity representative of an assumed wind, and means for indicating the azimuth heading of said airplane index whereby by observation of said chart through said drift sight, drift angle may be determined and ground track and ground speed of the assumed flight of the aircraft may be determined.

A further object of the invention is the provision of photoelectric radio compass simulating means whereby the bearing of an assumed radio compass station point on the chart relative to said airplane index may be determined.

Other objects and features of the invention will become apparent by reference to the detailed description hereinafter given and to the appended drawings in which:

Fig. 3 is a top plan view of the airplane index carriage;

Fig. 4 is a view illustrating the driving mechanism employed to drive the carriages;

Fig. 5 is an enlarged fragmentary view illustrating the details of the drift sight;

Fig. 6 is a sectional view illustrating the details of a modified compass heading indicating means for the airplane index of Fig. 1;

Fig. 7 is a fragmentary view taken on line 7—7 of Fig. 6;

Fig. 8 is a perspective view of radio compass simulating means for use with the assembly of Fig. 1;

Fig. 9 is a top plan view of the photocell indicator of Fig. 8; and

Fig. 10 is a schematic view illustrating the wiring diagram of the photocell indicator of Fig. 1.

Figure 1:
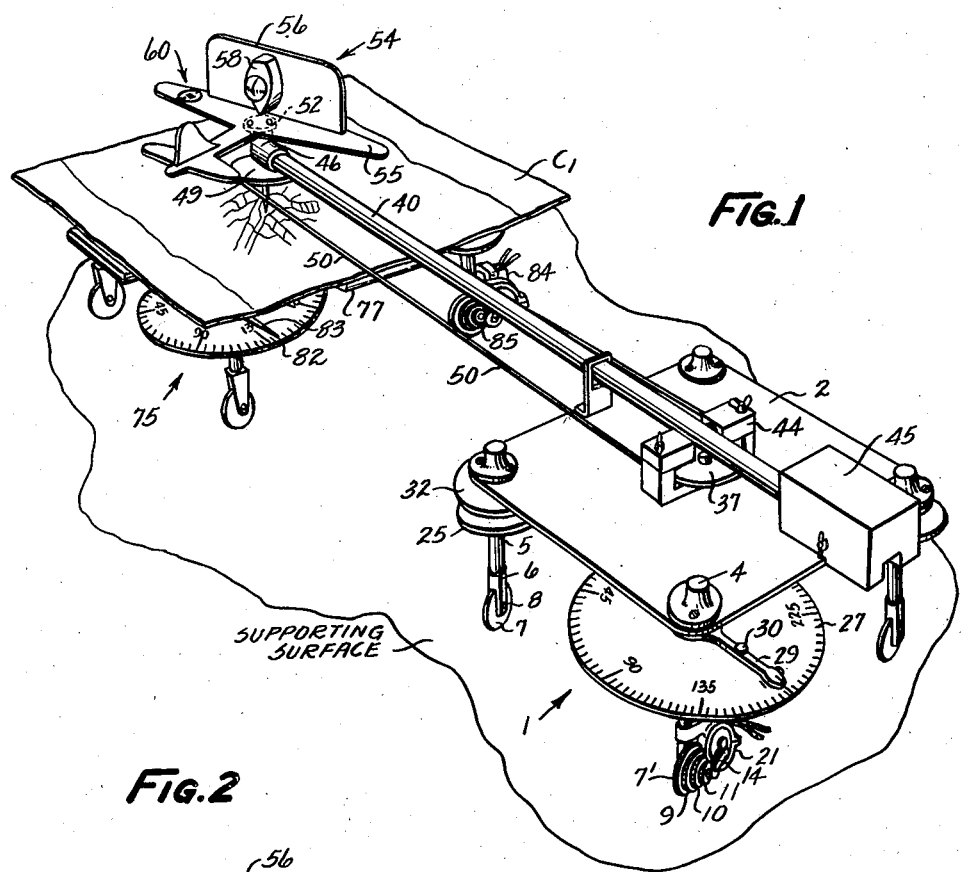
Fig. 1 is a perspective view of the principal elements of the invention.
Figure 2:
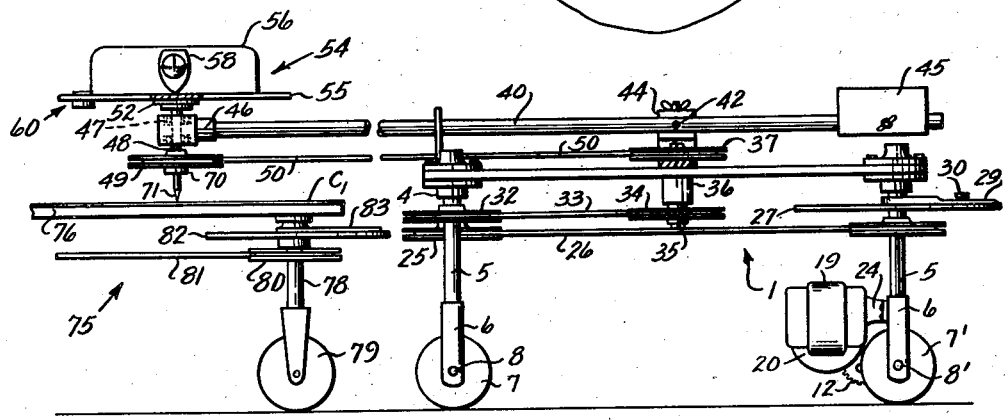
Fig. 2 is a side elevation of the assembly of Fig. 1 illustrating detail construction.

Referring now to Figs. 1 and 2, the reference numeral 1 generally indicates a power-propelled carriage which may, for convenience, be called the airplane index carriage and includes a rectangular metal frame member 2 having bearing supports 4 secured thereto, the supports being four in number and which serve to rotatably journal the respective downwardly extending roller-supporting shafts 5 by means of anti-friction bearings not shown. The shafts 5 at their lower ends terminate in forks 6 in which the rollers 7 are rotatably mounted on journals 8. One of the rollers is provided with a power propulsion means illustrated in detail in Fig. 4 and which will now be described.

Referring to Fig. 4 one of the rollers indicated as 7' is seen to be supported by a journal pin 8' which in turn is supported as a cantilever from one of the fork elements 6, the other being removed so as to not interfere with the driving mechanism. The roller 7' is freely rotatable on the pin 8' and has three driving gears of different diameters 9, 10 and 11 pinned thereto and also freely rotatable about the pin 8'. The driving gears 9 to 11 are adapted to be engaged selectively with a gear 12 rotatably supported by a bearing pin 13 from an arm 14 and in turn meshes with an idler gear 15 rotatably supported by a pin 16 secured to the arm 14. The idler gear 15 meshes with a pinion gear 17 fixed on the outer end of an armature shaft 18 of a small geared head, synchronous electric motor 19 which is secured to a disc 20 which also serves as a bearing support for the armature shaft 18, and the inner end of arm 14 being secured to the disc by screws or the like. The disc 20 is rotatably and axially adjustable in a ring support 21 which is split as at 22 and adapted to clamp the disc 20 in adjusted position by means of a clamping screw 23. By release of the clamping action of ring 21 the motor 19, disc 20 and arm 14 may be adjusted axially and rotated such as to bring gear 12 into mesh selectively with any one of gears 9, 10 or 11 and the assembly again locked by clamping screw 23 to establish any one of three driving ratios, so that it is possible to drive the airplane index carriage at any one of three speeds of translation corresponding to particular scale airspeeds. It should be understood that instead of change speed gearing, the synchronous motor may be replaced by an adjustable-speed motor, the speed of rotation being controlled by a variable resistance or by a centrifugal governor whose speed setting can be varied.

Referring again to Figs. 1 and 2, each of the roller-supporting shafts 5 has a pulley 25 rigidly mounted thereon, the pulleys being interconnected by a flexible cable or belt 26 so that rotation of one of the shafts 5 will cause an equal rotation of the supporting rollers 7 and 7'. One of the roller supporting shafts 5 has a large indicating disc 27 secured thereon which is provided with an azimuth scale and indicia on the upper side thereof (see Fig. 1), which cooperates with an indicating pointer 29 fixed on the corresponding bearing housing 4 of the frame 2 and provided witth a clamping screw 30 for locking the roller shafts 5 after a desired azimuth setting is obtained. By release of clamping screw 30 and rotating disc 27, any desired heading of the rollers 7—7' relative to the frame 2 can be obtained and the heading may be changed from time to time as desired. In order to have the carriage heading correspond to the magnetic compass heading it is necessary to align one of the axes of the frame 2 and the plane of the rollers 7—7' with a north-south axis and the frame 2 due to its mass and inertia will thereafter remain with a fixed orientation except for slight deviation due to frictional torques, which deviations are negligible.

One of the roller-supporting shafts 5 is provided with an additional pulley 32 which is connected by means of a flexible belt 33 to a pulley 34 which is mounted on a shaft 35 rotatably journalled in bearings carried in a bearing boss 36 formed integral with the frame 2 and centrally positioned thereon. The shaft 35 extends above the surface of frame 2 and has a pulley 37 mounted on its upper end for a purpose to be hereinafter described.

As seen in Figs. 1 and 2 a tubular arm 40 is pivotally supported by a spindle 42 mounted in bearings 43 housed in supporting blocks 44 secured to the frame 2 and symmetrically disposed with respect to the center thereof and providing for a limited vertical movement of the arm 40. At its inner end the arm 40 is provided with a slidably adjustable counterweight, and at its outer end is provided with a head 46 which is provided with ball bearings 47 to rotatably support a vertical spindle 48 which adjacent its lower end is provided with a pulley 49 which is rotatably connected by means of a flexible belt 50 to the pulley 37. At its upper end the spindle 48 is provided with a mounting plate 52, on which is mounted a miniature airplane index element 54 preferably made of a transparent plastic such as "Plexiglass" and having a planiform outline similar to that of an airplane. The miniature airplane index 54 is provided with wing portions 55 and has a transversely extending transparent panel 56 on which is mounted a conventional inexpensive magnetic compass 58.

A drift sight generally indicated by the reference numeral 60 is mounted in one of the wing portions 55 of the airplane index 54 and, as best seen in Fig. 5, the drift sight comprises two flanged transparent discs 62 and 63 which are rotatably mounted in a transparent flanged ring 64 cemented to the wing 55, the discs being retained in assembled relation by means of screws 65. The upper disc 62 has a plurality of parallel sighting lines 66 marked thereon to form a conventional drift sight reticule and is provided with a handle portion 67 by which the reticule may be rotated, a small pointer 68 indicating the drift angle relative to a drift angle scale 69 marked on the wing 55 concentric with the reticule.

Referring again to Figs. 1 and 2, the vertical spindle 48 carried by arm 40 is provided at its lower end with a socket 70 which serves to retain a marker 71 such as a pencil or inking pen for the purposes of recording ground track on a suitable chart such as indicated at $C_1$ and which is carried by a wind simulator carriage generally indicated by the reference numeral 75 and including a wood map board 76 secured to a rectangular frame 77 to which is secured roller shafts 78, each of which is provided with a supporting roller 79 and steerably interconnected by means of pulleys 80 and flexible belt 81. The heading of the rollers may be changed by rotation of an indicating disc 82 and the heading indicated by reference to a pointer 83. The wind simulator carriage is generally identical to the airplane index carriage 1 and is propelled at any one of three selected speeds by means of a motor 84 and change speed mechanism 85 identical to the drive previously described with reference to Fig. 4, and no further description of the details of the wind simulator carriage is believed to be necessary. The chart $C_1$ is fastened to the map board 76 of the wind simulator carriage 75 and may be propelled in translation over the surface of a table after orientation of the wind simulator carriage frame in any desired azimuth heading and at a scale velocity equivalent to an assumed wind.

Operation

In placing the apparatus thus far described into operation a conventional strip map is secured in proper alignment on the map board 76 of the wind simulator carriage 75 and the map board, frame 77 and the supporting rollers properly directionally aligned on a table surface preferably with respect to an established north-south line. The rollers 79 are then set for the desired wind heading by disc 82 with respect to pointer 83 and the change speed device 85 is set for the selected wind velocity, these operations being performed by an instructor.

The airplane index carriage is then placed on the supporting table surface so that the marker 71 rests on the chart $C_1$ and the counterweight 45 adjusted so that the marker leaves a trace on the chart with a minimum of pressure. The airplane index carriage frame is then properly orientated and the marker 71 placed at a desired starting point on chart $C_1$, the motor drive for the carriage having previously been adjusted for the selected airspeed setting. The student then orientates the rollers of the airplane index carriage so that its heading corresponds to a particular course on the map representing the assumed flight of an aircraft, allowance being made for compass variation. Both carriage propelling motors are then energized and the student can check the heading of the assumed flight by watching the compass. By observation of the map through the drift sight the student can note the divergence of the actual track of the marker 71 from the desired course and determine drift angle in the same manner as employing such a sight in an aircraft and make the necessary change in heading of the airplane index carriage rollers to compensate for drift. From time to time the instructor may change the simulated wind heading and may direct the student to divert from the set course in a predetermined manner and again return to the initial course. The apparatus may also be employed to determine drift without reference to the drift sight by the well-known windstar methods. By use of strip maps which include landmarks, railways, towns and roads, the student, by being able to directly observe the movement of the marker on the map, can determine all of the data actually employed in the solution of aircraft navigation problems involving dead reckoning and contact navigation. It will of course be understood that the wind drift carriage may be stationary to simulate conditions of flight with no wind.

In the apparatus as above described, the variation of the magnetic compass will be constant for the particular locality, while in actual practice, it will vary on a long flight, and further the magnetic compass will be affected by iron in a building so that its indications will not be accurate under such operating conditions. In place of the magnetic compass a simulated compass may be employed in the assembly of Fig. 1 such as illustrated in detail in Figs. 6 and 7. As seen in Fig. 6 the miniature airplane index 54 is mounted directly on the pulley 49 and the latter mounted by a ball bearing 90 on an enlarged portion 91 of a spindle 92 which at its lower end is provided with a stem portion 93 which makes a close friction fit in the bore 94 in head 95 which replaces the head 46 secured to arm 40, the head being provided with a compass variation scale 96 concentric with the axis of spindle 92 and adapted to cooperate with a pointer formed on the end of an arm 97 secured to spindle 92 and by which the same may be manually rotated. The spindle 92 projects upward and has a compass card 98 affixed to its upper end, the numerals of which are visible through the instrument panel 56 on the airplane index 54, the latter having a fixed lubber line 99 marked thereon for determining the simulated compass heading. In use the airplane index and the lubber line will rotate relative to the compass card, and the instructor, by rotation of the arm 97, may preset any desired compass variation which will have to be allowed for by the student in determining true magnetic heading, and the variation may be changed from time to time by the instructor.

Where additional expenditure is warranted, a novel and very simple means may be utilized in conjunction with the apparatus of Fig. 1 to give instruction in the use of the radio compass utilizing principles disclosed in my prior copending application Serial No. 323,561 for Photoelectric radio compass trainer control, filed March 12, 1940. This additional feature of the invention as seen in Fig. 8 comprises mounting a small high-intensity light 100 by means of a support 101 having a suction cup or like attaching means 102 on the lower end thereof to secure the same on the map table of the wind simulating carriage at a point immediately over a point on the chart representing an assumed radio transmitting station. The radio compass indicator assembly generally indicated by the reference numeral 105, comprises a sensitive, zero center, electrical meter such as a galvanometer indicated by reference numeral 106, mounted on the airplane index instrument panel 56 and having left-right indicia on the scale thereof and observed from the rear side of the panel, i. e. looking in the direction of movement of the airplane index 54. The indicating meter 106 is electrically connected to a pair of Photronic type or self-generating photoelectric cells 107 and 108 mounted on the front side of the instrument panel 56 and having a light dividing screen 110 placed between the cells so that the cells will receive an equal quantity of light from the light source only when the plane of the screen 110 passes through the light source (see Fig. 9).

The Photronic cells 107 and 108 are connected to indicator 106 in a bucking arrangement as shown in Fig. 10, i. e. the cells are connected in parallel in voltage opposition and the galvanometer shunted across the parallel connections so that if both cells generate an equal current by receiving an equal amount of light, the indicator will read zero, while if either cell receives more light than the other, the deflection of the indicator will be to the right or left of the center respectively.

*Operation*

The lamp assembly 100—102 is placed on the chart on the wind simulator carriage at a point over the assumed location of a radio transmission station and the lamp 100 illuminated from a source not shown. The airplane index carriage is then placed in operation in the manner previously described and if desired to simulate the effect of wind drift, the wind simulator carriage is placed in operation also. The room lighting during the conduct of the problem must be sufficiently dim as compared to the intensity of light transmitted from lamp 100 as not to interfere with the photoelectric cell reception of light. If the longitudinal axis of the airplane index and the screen 110 have a heading other than directly toward the radio station point, the Photronic cells will receive different quantities of light, and the indicator 106 is so connected in the circuit that it points in the direction of the cell receiving the greater quantity of light so that if the heading is to the left of the radio compass station the pointer will move towards the right, indicating that the station point is to the right of the present heading, and similarly for a course to the right of the station will cause a left indication, i. e. the pointer of the indicator should indicate the direction of the station from the instant heading. By manipulation of the steering control of the airplane index carriage the airplane index can be steered directly toward the station relying on the radio compass indication. By placing the wind simulator carriage in operation the effect of wind drift on a radio compass course will be readily apparent due to the necessity of making a continual change in heading of the airplane index carriage to compensate for drift, and the trace left on the chart will visually demonstrate the effect of wind.

It will be apparent that while I have disclosed a simple inexpensive apparatus which can be set up anywhere for demonstrating and teaching some of the principles of aircraft navigation, various elaborations of the basic equipment may be made such as providing infinitely variable motor drives for the airplane index and wind simulator carriages and remote steering control for these carriages. It should further be understood that the airplane index is not necessarily limited to a transparent planiform replica of an aircraft, but may simply consist of a means for supporting the drift sight and compass or compass indicating element and rotatable in accordance with the instant heading of the aircraft index carriage.

While a preferred form of the invention has been illustrated and described, many changes and variations therein will be apparent to those skilled in the art as coming within the scope of the invention as defined in the appended claims.

I claim.

1. A ground training apparatus for instructing students in the art of aerial navigation comprising in combination, a first power-propelled steerable carriage adapted to move in translation over a supporting surface in a direction and at a scale velocity representative of the assumed flight of an aircraft, manually operable means adapted to be actuated by the student for altering the azimuth heading of said carriage, an arm secured to said first carriage and movable therewith, a miniature airplane index rotatably mounted on the outer end of said arm, means interconnecting said airplane index to the means for altering the azimuth heading of said first carriage for maintaining a reference axis of said airplane index coincident with the heading of said first carriage, a chart representing the terrain over which the assumed aircraft flight takes place, a second steerable power-propelled carriage adapted to support said chart and move the same in translation over the supporting surface in a direction and at a scale velocity representing an assumed wind, said airplane index being movable over said chart and the relative movement therebetween representing the ground track of the assumed flight of said aircraft, and a drift sight carried by said airplane index through which the apparent drift of said airplane index from a predetermined course on said chart may be observed, and means associated with said drift sight for determining the drift angle.

2. The structure as claimed in claim 1, including means associated with said airplane index for determining the instant magnetic compass heading of the movement thereof.

3. The structure as claimed in claim 1, including means for altering at will the heading of said second carriage.

4. The structure as claimed in claim 1, in which means are provided for giving a simulated magnetic compass heading of the course of said airplane index, said means including a rotatably adjustable spindle mounted on said arm, said airplane index being rotatable concentric with the axis of said spindle, a compass card mounted on said spindle, means for rotatably adjusting said spindle and compass card to distort the orientation of said card to simulate compass variation and indicating reference means carried by said airplane index and rotatable therewith relative to said compass card to give the simulated compass heading.

5. Aerial navigation instruction apparatus of the character described including a first power-propelled carriage having steering mechanism and movable over a supporting surface in a direction and at a scale velocity representing the direction and airspeed of an assumed flight of an aircraft, said first carriage having a frame supported to maintain a fixed orientation irrespective of its direction of motion, a chart representing the terrain over which the aircraft flight is assumed to take place, a second steerable power-propelled carriage adapted to move over the supporting surface in a direction and at a scale velocity representing an assumed wind, said second carriage having a frame supported to maintain its orientation irrespective of the heading of said carriage and said chart being mounted on said carriage frame, an arm carried by said first carriage frame and extending laterally thereof to overlie at least a portion of said chart, a miniature airplane index mounted on the outer end of said arm and operatively connected to the steering mechanism of said first carriage such that a reference axis of said index corresponds to the instant heading of said first carriage, means carried by said index for indicating the heading thereof, and transparent means carried by said airplane index forming a drift sight for determining by direct observation therethrough of said chart the direction of apparent motion of said chart with respect to said airplane index and including means for determining the angle between the apparent drift and a reference axis on said airplane index.

6. The structure as claimed in claim 5, in which said miniature airplane index is made of a transparent material formed to give a plan view representation of an airplane and said drift sight comprises a transparent rotatably adjustable element mounted on said index, said element having a plurality of opaque sighting reference lines thereon, a drift angle scale on said index concentric with said rotatable element and a pointer on said rotatable element cooperating with said scale for giving drift angle indications.

7. In an aerial navigation instruction device, a power-propelled carriage having steering means and adapted to move in translation over a supporting surface, said carriage having a frame which retains a fixed spatial orientation irrespective of the direction of carriage movement, an arm mounted on said carriage frame and extending laterally thereof, a miniature airplane index element rotatably mounted on the outer end of said arm, means interconnecting said index and said carriage steering means for maintaining a reference axis on said index coincident with the heading of said carriage, a pair of self-generating photoelectric cells mounted on said index and rotatable therewith, a light dividing screen positioned between said cells and positioned in the plane of said index reference axis, a zero center electric meter mounted on said index, said cells being coupled in electrical opposition to said electric meter, a light source representing an assumed radio compass transmitting station and means for moving said light source in the direction and at a scale velocity representing an assumed wind, whereby said electric meter indicates the instant deviation of the movement of said airplane index from a course directed towards the assumed radio compass station.

8. The structure as claimed in claim 7, in which the means for moving said light source comprises a second steerable power-propelled carriage movable over said supporting surface, a chart mounted on said second carriage and having a point thereon representing the assumed radio compass transmitting station, said light source being supported on said carriage directly over the said point on the chart, and recording means carried by the arm of said first-named carriage to record on said chart the ground track of the assumed aircraft flight toward the assumed radio compass station.

CARL J. CRANE.